United States Patent [19]

Römer

[11] Patent Number: 4,925,153
[45] Date of Patent: May 15, 1990

[54] MEMBRANE VALVE FOR FLUIDS

[75] Inventor: Joachim C. Römer, Pullach, Fed. Rep. of Germany

[73] Assignee: AVS Ing. J.C. Romer GmbH, Strasslach, Fed. Rep. of Germany

[21] Appl. No.: 192,294

[22] Filed: May 10, 1988

Related U.S. Application Data

[63] Continuation-in-part of Ser. No. 70,943, Jul. 8, 1987, abandoned.

[30] Foreign Application Priority Data

Jul. 8, 1986 [DE] Fed. Rep. of Germany ....... 3622816
Mar. 26, 1987 [EP] European Pat. Off. ........ 87104487.1

[51] Int. Cl.⁵ .............................................. F16K 7/07
[52] U.S. Cl. .................................. 251/30.01; 251/45; 251/331; 251/129.21
[58] Field of Search ................... 251/61.1, 331, 30.01, 251/33, 45, 129.01, 129.21, 5

[56] References Cited

U.S. PATENT DOCUMENTS

| | | |
|---|---|---|
| 2,622,620 | 12/1952 | Annin . |
| 3,118,646 | 1/1964 | Markey . |
| 3,325,138 | 6/1967 | Connolly . |
| 3,467,131 | 9/1969 | Ratelband . |
| 3,624,801 | 11/1971 | Gannon ........................... 251/61.1 X |
| 3,836,113 | 9/1974 | Johnson ............................. 251/61.1 |
| 3,840,207 | 10/1974 | Carpenter, Jr. . |
| 4,056,965 | 11/1977 | Heiser . |
| 4,451,023 | 5/1984 | Zakai ............................. 251/61.1 X |

FOREIGN PATENT DOCUMENTS

| | | |
|---|---|---|
| 1765240 | 12/1956 | Fed. Rep. of Germany . |
| 1500019 | 6/1969 | Fed. Rep. of Germany . |
| 2050942 | 4/1971 | Fed. Rep. of Germany . |
| 7233339 | 1/1974 | Fed. Rep. of Germany . |
| 3133060 | 4/1982 | Fed. Rep. of Germany . |
| 7202033 | 1/1972 | France . |

*Primary Examiner*—Alan Cohan
*Attorney, Agent, or Firm*—Merchant, Gould, Smith, Edell, Welter & Schmidt

[57] ABSTRACT

A tubular membrane-tight flow valve features a waisted support body for the membrane which seals against an annular sealing surface at the waist of the support body. This special shape of the support body is effective in avoiding closing hammer. In the preferred embodiment the membrane is made fractionally longer than the waisted support body and this results in extremely quiet operation of the valve.

31 Claims, 7 Drawing Sheets

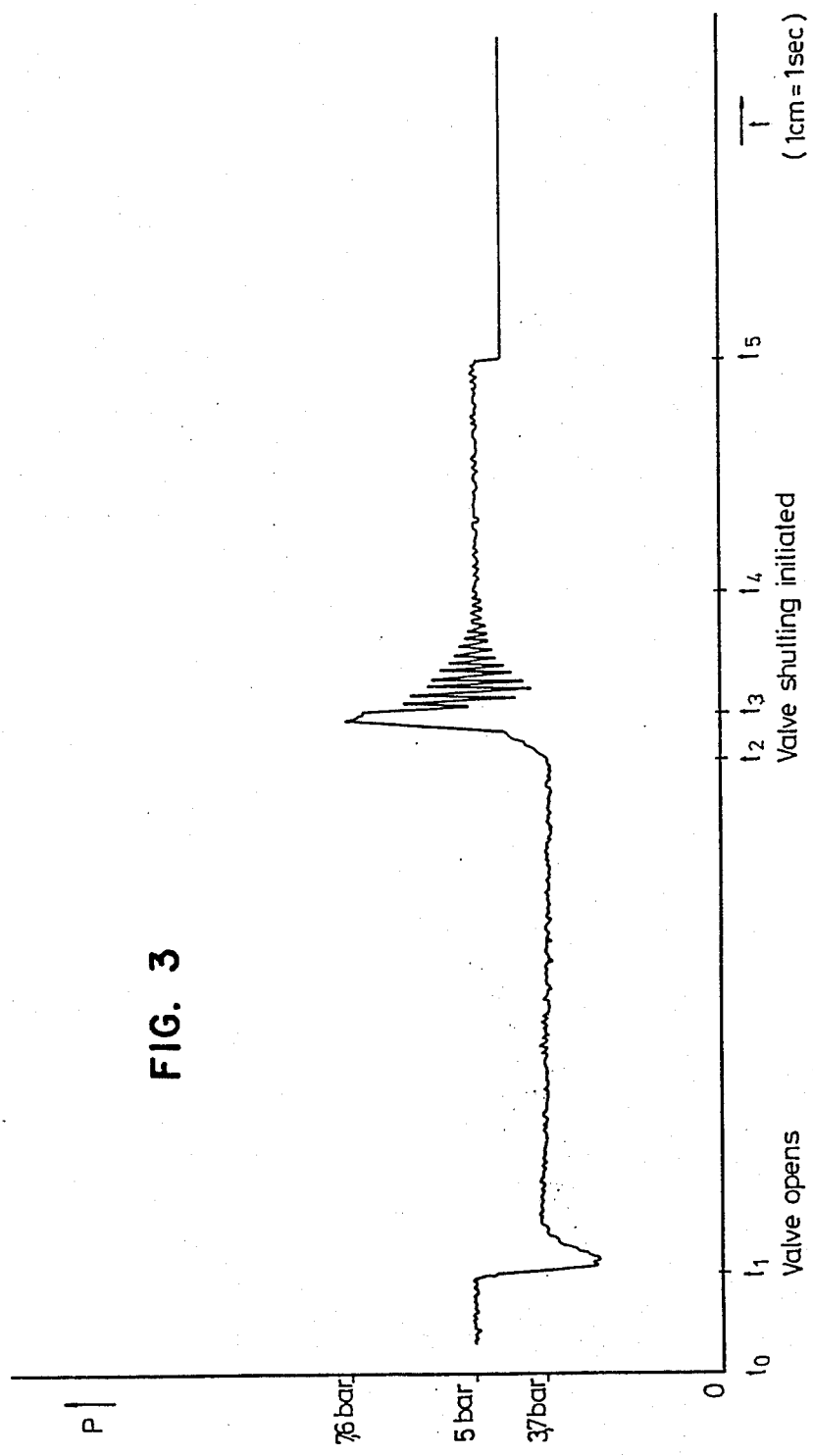

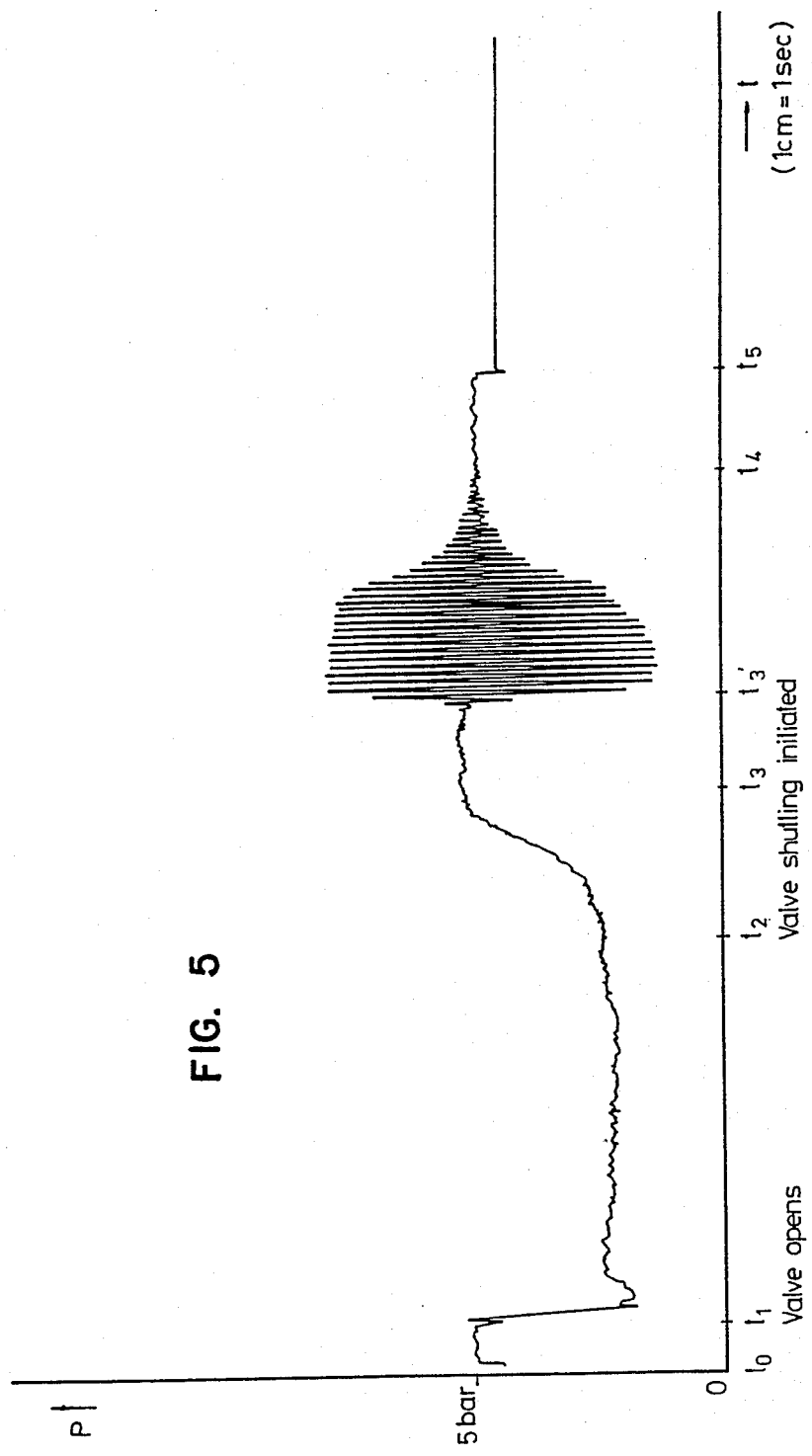

MEMBRANE VALVE FOR FLUIDS

The present application is a continuation in part application of US patent application Ser. No. 070,943 filed 7/8/87 and relates to embodiments of membrane valves as disclosed in that earlier application (now abandoned) and to further developments of those valves.

Membrane valves are in wide spread use for the control of pressurised air and other fluids, such as oil and water. Typical examples of such valves are for example shown in the brochure 10000/2/72 of the company Bürkert, Ingelfingen. These valves comprise a housing base part which accommodates an inflow connection, an inflow region, an outflow region and an outflow connection. The outflow connection opens into the center of the housing and is surrounded in ring-like manner by the inflow region. It is also possible, as known from the brochure 7504 type L142 of the company Sirai Pioltello (Italy), to allow the inflow region to open into the center of the housing so that it is surrounded in ring-like manner by the outflow region. In both cases a housing cover which contains a control chamber is secured in fluid-tight manner on the base part of the housing and a membrane which is mostly of disk-like form is inserted between the two housing parts. The membrane generally contains a ring-like "roll region" in order to ensure an appropriate membrane stroke.

It has shown itself to be disadvantageous with this type of construction that a pronounced pressure drop occurs during the opening process, and in particular that a sudden pressure increase occurs during the closing process. These processes are the cause of disturbing, short term, pressure fluctuations in the pipeline or network of pipelines in which the valve is installed. With gaseous media, and in particular with liquid media, pressure peaks can occur especially on the closing of the valve which reach a multiple of the operating pressure. These pressure peaks, referred to as closing hammer, not only result in the generation of undesirable and objectionable noise, they can also lead to destruction of the duct system and of apparatus incorporated therein.

It is practically impossible to control such membrane valves with an external medium. The control pressure can only be slightly higher than the fluid pressure which is to be controlled because otherwise the membrane would be pressed into the two flow regions and would be damaged in this way. In some embodiments the valve is actuated by the energy of the medium flowing through the valve. These are termed servo-controlled membrane valves. In such valves the control chamber is connected with the outflow connection and a restrictor opening is provided in the membrane. The connection between the control chamber and the outflow connection is controlled by a cut-off valve. With this arrangement closing hammer cannot be avoided because, even if slow lowering of the membrane is selected, by appropriate layout of the restrictor opening in the membrane and the cross-section of the control lines, the strong flow over the partition wall edge separating the inflow and outflow regions cannot be sufficiently damped over the short path of travel of the membrane. Shortly before the membrane contacts the upper edge of the partition wall the speed of the fluid increases rapidly, the pressure value at this position thereby drops rapidly and the final closing process is greatly accelerated by the hydrostatic pressure in the control chamber. With the reversed direction of flow a stagnation pressure first operates which however reduces to zero shortly before closing of the valve as the membrane approaches the partition wall and this reduced pressure considerably accelerates the closing process.

Furthermore, the known membrane valves of the above described kind are relatively bulky so that their physical size often hampers their installation in pipe networks. Moreover, the undue physical size of these valves means that they contain a lot of material and they are therefore relatively expensive.

Having regard to all these problems an effort was made by the present applicant to provide a completely new design of membrane valve with improved opening and closing behaviour, with it being possible to use the valve either as a servo-controlled membrane valve or as a membrane valve controlled by an external medium with a large control pressure range. Furthermore, it was the intention to construct a membrane valve having dimensions considerably smaller than those of existing membrane valves for the same function. The initial result of these considerations was a valve of the kind shown in FIG. 1 of the aforementioned U.S. patent application Ser. No. 070,943, the operation of which was described with reference to FIGS. 2a to 2c of that application. FIGS. 1 and 2a to 2c of U.S. application Ser. No. 070,943 are reproduced as FIGS. 1 and 2a to 2c of the present application to facilitate an understanding thereof.

On further investigation of these valves the applicant became aware that valves of this general kind had in fact already been proposed in the prior art and indeed some valves in accordance with these prior art principles had in fact been constructed.

By way of example reference may be made to U.S. Pat. Nos. 3 325 138, 3 467 131, 2 622 620 and possibly also to U.S. Pat. No. 3 840 207, which is however considered rather less pertinent.

All these known valves, with the possible exception of U.S. Pat. No. 3 840 207 feature a membrane valve for controlling fluids, the valve comprising a housing surrounding a substantial tubular chamber and having an inlet end and an outlet end; a sleeve-like resilient membrane extending within said tubular chamber from said inlet end to said outlet end; and a fluid permeable membrane support body disposed within said sleeve-like membrane and extending from said inlet end to said outlet end; wherein said membrane support body has an annular sealing surface extending around it intermediate said inlet and outlet ends; wherein a partition wall divides said support body into a fluid permeable inlet portion, disposed between said inlet end and said annular sealing surface, and a fluid permeable outlet portion disposed between said sealing surface and said outlet end. In all these valves some form of means is provided for producing movement of the membrane between a valve open position in which said membrane is spaced from said annular sealing surface and permits flow from said inlet end through said fluid permeable inlet portion over said annular sealing surface through said fluid permeable outlet portion and out of said outlet end, and a valve closed position in which said membrane sealingly contacts said annular surface and substantially prevents flow through said valve.

Applicant also built valves of this general kind, were however surprised to discover that although advantages were achievable with respect to compactness and the ability to control the valve with a control pressure which varies within a wide range, the membrane valves of the prior art kind nevertheless result in substantial closing hammer.

The principal object of the present invention is thus to provide a membrane valve of the generally tubular type in which closing hammer, or at the very least the sharp and particularly destructive pressure peaks are avoided. Moreover, it is a further object of the present invention to provide valves of this kind which are particularly compact and economical in construction, which are easy to manufacture and assemble, and which have a long working life and excellent opening and closing properties.

In order to satisfy these objects the present invention provides a membrane valve of the above described tubular kind having the special feature that at least said outlet portion of said membrane support body has a divergent at least substantially frusto conical shape with a narrower diameter region adjacent said sealing surface and a broader diameter region adjacent said outlet end of said valve. I.e. a valve of the kind shown in FIG. 6 of U.S. patent application Ser. No. 070 943 forming FIG. 4 of the present application. In particular preference is given to a membrane valve in which the inlet portion also has a substantially frusto conical shape with a narrower diameter region of said inlet portion being disposed adjacent said sealing surface and a broader diameter region adjacent said inlet end of said housing. Thus, whereas the prior art valves have all provided a support body with a generally cylindrical or barrelled outer surface the present invention has consciously provided such valves with a waisted cylindrical shape. It has surprisingly been found that this waisted shape results in a rolling and stretching action of the membrane as it closes, with this rolling and stretching movement progressing from the outlet end of the valve to the annular surface and then to the inlet end, and that this rolling and stretching movement substantially attenuates the pressure peaks which occur during closing thus reducing the danger of closing hammer.

In particularly preferred embodiments the narrower diameter regions of said inlet and outlet portions are of substantially the same diameter, as are the broader diameter regions of said inlet and outlet portions.

In a particularly preferred embodiment said support body has a length dimension measured in the axial direction along its radially outer surface which is less than a corresponding length dimension in a relaxed state of a portion of said membrane adapted to contact said radially outer surface in said valve closed position.

Rather surprisingly it has been found that with this arrangement, i.e. where the said corresponding length dimension of said membrane is from 4 to 8% and preferably 6% greater than said length dimension of said support body, the closing hammer is almost fully eliminated which represents a real breakthrough in such valves. Moreover it has been found that the opening behaviour of these valves is also substantially improved. Furthermore, the waisted shape of the membrane support body results in a substantial reduction in the deflection suffered by the fluid on flowing from the inlet end to the outlet end. This again results in a reduction in the physical size necessary for a valve to satisfy a particular function, since the space required to accommodate the flow over the annular sealing surface is now provided by the waisted portion of the support member.

The reduced deflection and improved flow properties of the flow through the waisted support body, which are particularly noticable when said inlet and outlet portions thereof are hollow, can be improved still further if inlet and outlet flow cones are provided at said partition wall within said inlet and outlet portions respectively. The use of a flow cone is known per se from U.S. Pat. No. 2 622 620.

Although the fluid permeable support body can comprise an essentially sintered structure of generally spherical particles, which also achieves a filter effect, an arrangement is preferred in which a plurality of elongate slots are provided in said inlet portion and in said outlet portion permitting flow outwardly through said inlet portion and inwardly through said outlet portion. In an arrangement of this kind the slots preferably extend in an axial direction and are conveniently defined between webs of said inlet and outlet portions, with said webs having radially outer surfaces belonging to a common envelope surface contactable by said membrane in said closed position.

The use of slots to make the support body permeable is admittedly known per se from U.S. Pat. No. 3 325 138, however the special combination of elongate, in particular axially extending slots with a waisted support body again improves the flow through the valve resulting in more linear flow, less turbulence, less noise and less flow resistance. In other words by reducing the flow resistance for a given valve size, the valve itself can also be made smaller to fulfill a particular function, once again increasing the compactness of the design.

Said fluid permeable support body preferably comprises an injection molding which enables it to be accurately made in a medium resistant to virtually all fluids encountered in use. The inlet portion and the outlet portion of said fluid permeable support body indeed preferably comprise respective injection moldings, there being connection means at said partition wall for connecting said first and second injection moldings together. In one embodiment said connection means comprises a snap connection.

With such arrangements a ring member is conveniently interposed between said moldings defining said inlet portion and said outlet portion, with the radially outer surface of said ring member defining said annular seating surface. This annular seating surface preferably takes the form of a raised annular bead at the radially outer surface of said ring member. In this arrangement the ring member can be made of a different material from the flow permeable inlet and outlet portions and thus be made more resistant to wear.

Moreover, when using first and second mouldings for the inlet and outlet portion the elongate slots in the inlet portion can open at an end face thereof remote from said inlet end and the elongate slots in said outlet portion can open at an end face thereof remote from said outlet end. The fact that the slots open at one end at an end face of the respective component makes it substantially easier to injection mould these components, since it is not necessary to provide radially movable mold parts for the moulding of the elongate slots and subsequent removal of the moulded component from the mould.

In a design of the support body in which an inlet flow cone is present in said inlet portion and an outlet flow cone is present in said outlet portion, said means connecting said portions together can either comprise a snap connection or a male threaded element present in one of said flow cones which engages into an aperture adapted to receive said threaded element in the other of said flow cones, thus forming a threaded connection between said inlet and outlet portions. In the latter arrangement the threaded element is preferably a screw which is screwed into the associated one of said flow cones before that flow cone with screw is screwed into the other one of said flow cones with said screw then engaging into the aperture in the other said flow cone. In this way the first and second mouldings can be made identical in shape to only one injection mould is required to produce the support body.

Alternatively, a screw can be moulded into one of said flow cones for engagement in an aperture in the other one of said flow cones.

In a particularly preferred embodiment said tubular chamber has a first radially inwardly extending ring shoulder adjacent said inlet end and a second radially inwardly extending ring shoulder adjacent said outlet end. The sleeve-like resistant membrane then has radially inwardly extending flanges adjacent said inlet end and said outlet end and, in the assembled state, the first flange is pressed against the first ring shoulder by said inlet portion of said support body and the second flange is pressed against the second ring shoulder by the outlet portion of said support body.

This embodiment is particularly easy to manufacture, both from the point of view of manufacturing the housing, which preferably comprises first and second parts each containing one of said ring shoulders, there being screw means for securing said first and second parts together, and from the point of view of moulding the resilient sleeve-like membrane and the support member. Assembly of the valve is also greatly facilitated as is the provision of a reliable mounting of the membrane.

A plurality of ribs are preferably provided on a radially outer surface of said resilient member in order to space the membrane from said housing in said open position, thus facilitating the flow of an actuating fluid around the membrane on movement from the open position to the closed position.

The means for producing movement of said membrane preferably comprises means for supplying pressure to and for venting the space defined between said housing and said flexible sleeve-like membrane, as known per se from U.S. Pat. No. 2 622 620.

In an alternative embodiment, in which the membrane is magnetisable and preferably of low magnetic retentivity, at least adjacent an inflow region thereof, the means for producing movement of said membrane comprises a magnetic circuit.

Most preferred is however an arrangement in which said means for producing movement of said membrane comprises duct means communicating between said outlet end of said housing and said tubular chamber radially outside of said membrane, a pilot valve for selectively blocking and freeing said duct means, and a restrictor opening in said membrane with said restrictor opening having a flow cross-section smaller than the minimum flow cross-section of said duct means when freed by said pilot valve. This arrangement is thus a servo-controlled arrangement which can readily be controlled by an electromagnetic solenoid. This facilitates the remote control of the valve. Moreover, the solenoid can be made very small which satisfies the aim of the invention with respect to the production of a compact design.

In a particularly preferred version of this embodiment said duct means is formed, at least in part, in an insert inserted into said tubular housing at the outlet end thereof.

The duct means may comprise a radial bore in said insert, with said radial bore opening at a radially outer surface of said insert and forming an opening capable of being selectively blocked or freed by the armature of a solenoid forming said pilot valve. Said opening in said insert is preferably disposed within a projecting ring seat. Moreover, the duct means usefully further comprises a channel in the radially outer surface of said insert leading to said tubular chamber radially outside of said membrane.

By using an insert of this kind it is possible to fashion the insert as a moulded component which is substantially easier than drilling the inclined bores in the housing which are otherwise required. Moreover, the insert may be made of a material such that the ring-like shoulder around said opening forms a compliant seat for the cooperating end of said armature of said solenoid.

It is equally possible for said insert to be joined to said membrane at an axially downstream end thereof, for example by an adhesive or by ultrasonic welding or a similar technique. If this technique is adopted the membrane and inserts are readily assembled into the tubular housing and the danger of an operator assembling the valve incorrectly can be minimised. The invention will now be described in more detail with reference to the accompanying drawings in which are shown:

FIG. 1 a basic type of tubular membrane valve investigated by the Applicants and as also shown in FIG. 1 of U.S. application Ser. No. 070,943, FIGS. 2a to 2c diagrams for explaining the operation of the valve of FIG. 1, FIG. 3 a graph showing the pressure fluctuations created by closing hammer in a valve such as is shown in FIG. 1, FIG. 4 a first embodiment of a membrane valve in accordance with the present invention, FIG. 5 a graph illustrating the pressure fluctuations obtained on closing the valve of FIG. 4, FIG. 6 a longitudinal cross-section through a modified embodiment of the valve of FIG. 4 in which the sleeve-like membrane is longer than the basket-like support structure, FIG. 7 a graph similar to the graphs of FIGS. 3 and 6 showing the superior performance of the valve of FIG. 6, FIG. 8 is a modified version of the value of FIG. 6.

Figure 1:
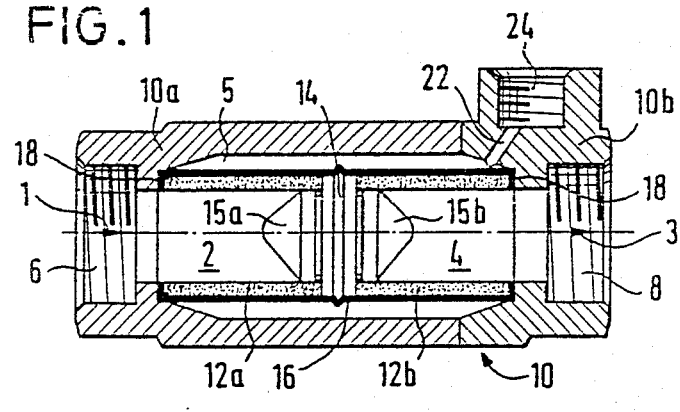

FIG. 1 shows a membrane valve which is of substantially coaxial construction. It has a housing 10 which consists of a tubular housing part 10a and a downstream housing part 10b which carries the connection for the external control medium. A customary screw-in connection 6 for the inflow of the fluid to be controlled is contained in the housing part 10a at the inlet end, and this connection is followed by an enlarged chamber. The downstream housing part 10b which can be connected in fluid-tight manner with the housing part 10a by screws (not shown), or in another manner, has the outflow screw-in connection 8 at the outlet end and an external control connection 24 from which a passage 22 leads to the interior of this housing part. A tubular support body 12 is inserted into this housing 10 and consists, for example, of separate inflow and outflow portions 12a and 12b at the inflow and outflow sides. A partition wall 14 is inserted between these two portions 12a and 12b and is provided at both sides with flow cones 15a and 15b respectively. These flow cones which improve the flow behaviour of the controlled fluid can advantageously be constructed as a cone with a rounded apex and with a cone angle of ca. 90°.

The support tube sections 12a and 12b consist in the illustrated membrane valve of a fluid permeable porous sinter material which, depending on the nature of the fluid to be controlled, can consist of small sintered copper balls, stainless steel balls etc.

Figure 2A:
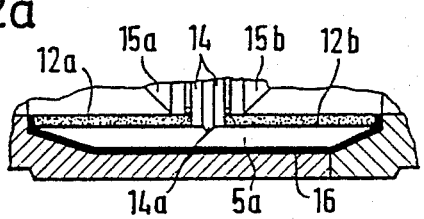
Figure 2B:
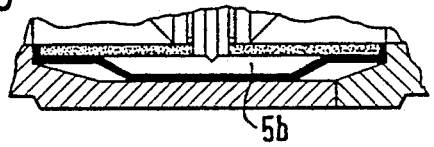

The partition wall 14 which is held by the support wall is preferably flush with the outer diameter of the support wall or projects slightly beyond it. Indeed it could also be slightly recessed inside the support wall. When the partition wall projects it forms a sealing surface or seating edge 14a as shown in FIG. 2a. A flexible fluid impermeable hose 16 is pushed over the tubular structure consisting of the support tubes 12a and 12b and the partition wall 14 to form a sleeve-like resilient membrane. with the diameter of the hose in the relaxed state corresponding approximately to the outer diameter of the support tube 12. On assembly the membrane is clamped at the clamping regions 18 between the ends of the support tube 12 and the associated local wall of the housing 10. In this way an inflow region 2, an outflow region 4 and a control chamber 5 are formed by appropriate shaping of the interior chamber of the housing. The membrane 16 moves, on being actuated, within the control chamber 5 between the support wall 12 and the inner wall of the housing 10. The passage 22 leading from the control connection 24 opens into the control chamber 5.

The operation of this externally controlled membrane valve is easily understood with reference to FIGS. 1 and 2a to 2c. The medium to be controlled flows in the direction of the arrow 1 through the connection 6 into the inflow region 2. When its pressure lies above the pressure which prevails in the control chamber 5 the membrane 16 is lifted so that it contacts the inner side of the housing 10 and a concentric flow now takes place through the overflow region 5a freed by the membrane 16 into the outflow region 4 and in the direction of the arrow 3 through the outflow connection 8. This flow is assisted by the conical flow projections 15a and 15b. The damaging contaminants which are carried along by the fluid to be controlled are captured in the sintered material of the support tube 12. If pressure is now applied to control chamber 5 via the connection 24 for the control medium and the passage or line 22, and indeed with a pressure which lies above that of the fluid to be controlled, then the membrane will be caused to move away from the inner wall of the housing and into contact again with the support tube 12.

Figure 2C:
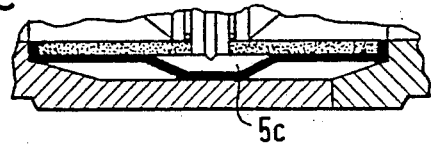

In the fully open state the membrane 16 fully contacts the wall of the housing as shown in FIG. 2a while the action of the pressure on the membrane by the control medium causes it to lift away from the inner wall of the housing 10 and to contact the support tube. In theory this initially takes place in the outer regions (FIG. 2b) with the overflow region 5b reducing in size. This contact progresses from both sides towards the sealing edge 14a of the partition wall 14 until finally there is only a small overflow region 5c which remains open around the seating edge (FIG. 2c). The rate of flow of the fluid to be controlled reduces in corresponding manner. Finally the central part of the membrane 16 is also pressed against the seating edge 14a and the valve is shut, i.e. the membrane 16 once again adopts the position of FIG. 1.

In theory it was expected that this closing process would take place so softly that the damaging closing hammer is practically precluded.

In practice however, this was not case as can be seen from the graph of FIG. 3.

This graph shows a plot of pressure against time for the flow through the valve of FIG. 1, with the pressure being measured upstream of the valve.

As can be seen from the graph the valve was initially closed at time $t_0$ and was acted on by a water pressure of 5 bar. At time $t_1$ the valve is opened and the pressure drops to a steady level of approximately 3.7 bar, there being an initial reduction in pressure to 2.5 bar on opening of the valve. At the time $t_2$ the valve is shut by the application of a control pressure to the chamber 5. It will be noted that there is an initial pressure peak at the time $t_3$ which reaches a pressure level, according to the graph, of 7.6 bar and has a considerable energy as shown by the area under this pressure peak. This is therefore the pressure peak of the closing hammer. In actual fact the pressure peak is considerably higher, the measuring instruments cannot however respond sufficiently quickly to the pressure peak for it to be recorded. Moreover, it must be born in mind that this rapid step increase in pressure dilates the pipelines and associated apparatus and there is thus a reduction in the peak pressure due to the dilation that has occurred. This dilation is however extremely damaging and can readily lead to failure of the pipe network or of sensitive apparatus contained therein.

Following the pressure peak $t_3$ there is a pressure fluctuation of reducing amplitude which gradually dies away in the time period from $t_3$ to $t_4$. At $t_4$ the valve is closed and the pressure has returned to the initial level of 5 bar. At time $t_5$ the pressure recording is discontinued. It is interested to note that the pressure fluctuations in the period $t_3$ to $t_4$ take place at a constant frequency and that this frequency seems to be a constant for a wide variety of pipe networks. Subjectively the closing hammer is heard as a loud bang and the pressure fluctuations as a continuous rustling in the pipe network which endures for about 2 seconds.

This graph shows conclusively that the prior art valve connections are not able to reduce closing hammer satisfactorily.

Figure 4:
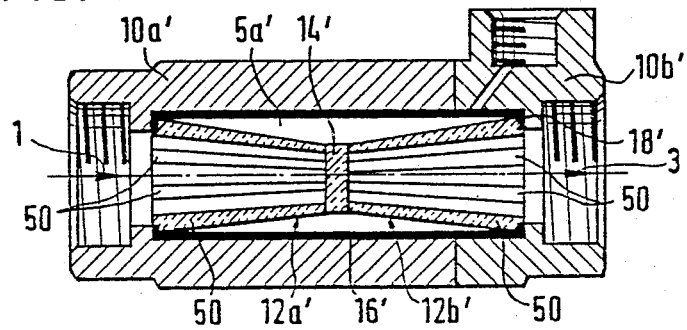
Figure 6:
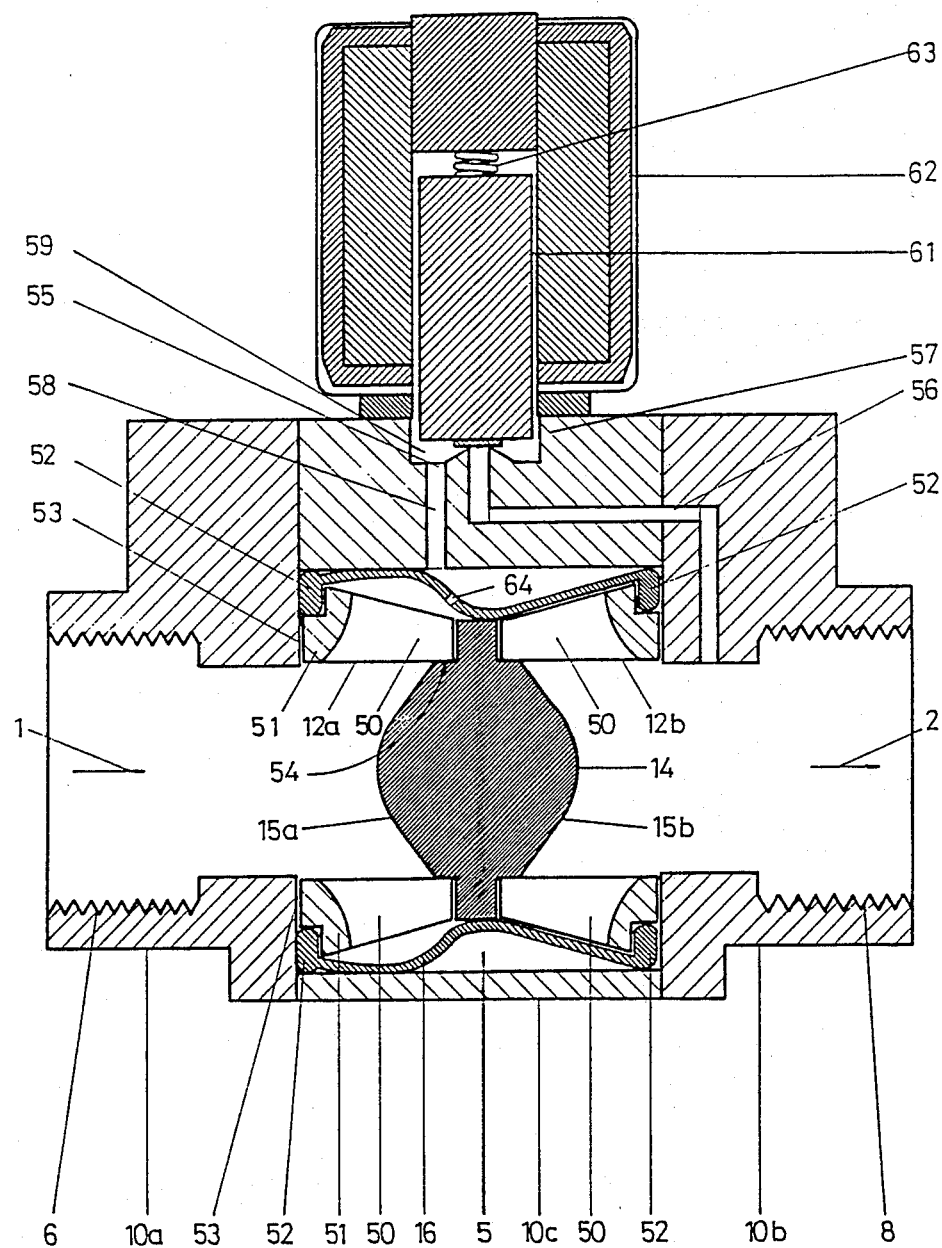

A first embodiment of the present invention is now shown in FIG. 4 which corresponds to FIG. 6 of the original application Ser. No. 070,943.

The important distinction over the embodiment of FIG. 1 is the provision of a support body with a waisted shape. The inflow and outflow portions 12a and 12b each consist in this embodiment of a respective cage-like truncated cone shaped structure, with each of the cone shaped structures comprising a plurality of elongate webs 50 which are spaced apart to define elongate slots 74 between them. The fluid permeable support body may be constructed of a sintered material. The truncated cone shaped structures clamp the membrane at the upstream and downstream ends respectively at the positions 18 but otherwise permit, in the opened position shown in FIG. 4, the free flow of fluid through the valve from the inlet end to the outlet end. The two truncated cone-like structures are connected together at their narrow ends, i.e. at the regions of smaller diameter, to the closed partition wall 14, or are connected together at these ends by the partition wall 14. The larger diameter regions of the truncated cone-like structures are respectively disposed at the inlet end and outlet end of the valve and bear on respective radially inwardly projecting flanges of the membrane and press these flanges against corresponding ring shoulders of the housing.

The inclined outer surfaces of the support wall with the elongate slots which remain between the webs 50 promote the flow through the valve in the open position in an acceptionally favourable manner since the deflection of the flow as it flows through the valve is minimised. Generally speaking, it will however be preferred for flow cones similar to the flow cones 15a and 15b of the embodiment of FIG. 1 to be provided at the partition wall to further assist the smooth flow of fluid through the valve in the open position.

Practical tests with a valve of this construction including flow cones have shown that it does avoid the substantial pressure peak which occurs with the embodiment of FIG. 1, i.e. the pressure peak at the time $t_3$ in FIG. 3.

A graph illustrating this fact is shown in FIG. 5.

From this graph it will be noted that the behaviour of the valve up to the time $t_2$ at which the closing of the valve is initiated is similar to the behaviour of the valve of FIG. 1. It will however be noted that the pressure upstream of the valve in the open state has reduced to 2 bar. This is partly a result of the reduced flow resistance of the elongate slots when compared to the sintered support body of FIG. 1 and is also partly due to the reduced deflection which the flow itself has to undergo on passing through the valve from the inlet end to the outlet end.

The interesting thing to note about the graph of FIG. 5 is that the valve is fully closed at the time $t_3$ and that there is no excess pressure at this time. However, some two seconds later, after the valve has closed, an extremely surprising effect is noted, namely that the valve starts to open again and continues to open and shut rapidly at a constant frequency which takes some $4\frac{1}{2}$ seconds to die away. This oscillation is not considered to be anything like as damaging as the closing hammer which occurs with the valve of FIG. 1, it is however a source of noise and thus of annoyance. Once again at $t_4$ the valve is fully closed and the oscillation has died away. Thereafter the recording was discontinued at time $t_5$. This vastly improved behaviour, i.e. the total avoidance of the damaging pressure peak of the closing hammer is due to the waisted shape of the support body, in particular to the divergent shape of the outflow portion. It appears that as the pressure is introduced into the chamber 5 through the connection 24 the membrane is pressed against the broad end of the outflow portion and progressively contacts the outer surfaces of the webs 50 by a type of rolling movement in which a wave in the membrane unrolls onto the outer surface of the webs. Moreover, it appears that this rolling movement is accompanied by a stretching of the membrane and that the combined stretching and rolling allows a gradual and progressive closing of the flow cross-section over the annular sealing surface 14a with this progressive and gradual reduction of the flow area over the sealing surface 14a being the explanation for the avoidance of closing hammer.

It will thus be noted that although the closing hammer is no longer present the rustling noise is still apparent.

The reason why the valve then starts to open again and executes the oscillations shown in FIG. 5 from the time at $t_3$, to $t_4$ is not fully understood. It may be due to an underpressure being developed downstream of the partition wall after closing of the valve with this underpressure being subsequently reflected at an interface in the system and returning as a pressure wave which opens the valve slightly and that there is then a rapid oscillation of the membrane between the open and closed positions.

Despite the fact that this phenomenen is not fully understood a way has been found of successfully avoiding it.

A further embodiment of the membrane valve of the invention in which post closure oscillation is avoided is shown in FIG. 6.

In the embodiment of FIG. 6 the housing comprises first, second and third parts, namely an inflow portion 10a, an intermediate portion 10c and an outflow portion 10b. These three parts are held together by threaded fasteners which are not shown in the drawing. Once again the support body has a waisted shape and comprises an inflow portion 12a in the form of a convergent truncated cone, an outflow portion 12b in the shape of a divergent truncated cone section and a partition wall 14 with integral flow cones 15a and 15b. Once again the inflow and outflow portions 12a and 12b have elongate axially extending slots defined between webs 50. The webs 50 of the inflow portion 12a are joined to a solid ring 51 at their upstream ends with the solid ring 51 serving to hold the webs 50 at the required angular spacing and also to trap the radially inwardly projecting flanges 52 of the sleeve-like resilient membrane against the ring shoulders 53 of the housing portion 10a.

It will be noted that the webs 50 at the downstream end of the inflow portion 12a are not connected together into a ring but are instead left open. This greatly facilitates the manufacture of the inflow portion 12a. The downstream ends of the webs 50 seat on a ring shoulder 54 of the partition wall 14 and adequately locate the same. The outflow portion 12b is in fact identical to the inflow portion 12a and is made with the same injection moulding tool. It is however simply reversed to produce the desired waisted shape of the overall support body.

In distinction to the embodiment of FIG. 4 the valve shown here is not controlled from an external pressure source but is instead servo-controlled. For this purpose the space 5 between the housing part 10c and the sleeve-like membrane 16 is connected via duct means 55 to the downstream end of the valve. The duct means 55 comprises a first duct portion 56 leading from the downstream end of the valve to a ring seat 57 and a second duct portion 58 which communicates between the space 5 and a ring chamber 59 formed around the ring-like valve seat 57. This valve seat is normally closed by the armature 61 of a solenoid 62 which, in the deenergised state of the solenoid, is urged against the ring seat 57 by a spring 63 thus closing of the opening of the ring seat 57 and blocking the duct means 55. Furthermore it will be noted that the membrane 16 contains a restrictor opening 64 with an opening which is smaller than the flow cross-section of the duct means 55 when in the freed state. This freed state is achieved by energising the solenoid 62 which then pulls the armature 61 upwardly freeing the opening in the ring seat 57. The drawing of FIG. 6 in fact shows the valve as it moves towards the closed position. The solenoid has been deenergised, the opening in the ring seat 57 and thus the duct means 55 is blocked and the pressure at the inlet side of the valve is gradually building up in the chamber 5 through the restrictor 64 and forcing the valve to close.

To open the valve the solenoid is energised which lifts the armature from the ring seat 57 and allows the lower pressure at the downstream side of the valve to communicate with the ring space 5 via the duct means 55. This reduced pressure on the outside of the membrane results in it being lifted by the excess pressure at the inlet side of the valve, with the fluid already present in the chamber 5 being vented via the duct 56 to the downstream end of the valve.

The important distinction between the valve of FIG. 6 and the valve of FIG. 4 which results in the improved behaviour thereof is not however the alternative method of operating the valve but rather the special construction of the hose-like membrane 6 and the support body so that the length of the membrane is greater than the length of the outer surface of the support body measured in the longitudinal direction over the outside of the webs 50 of the inflow portion 2a, over the annular sealing surface 14 and over the webs 50 of the outflow portion 12b. This excess length of the membrane which is expediently 4 to 6% longer than a "generatrix" along the outside surface of the support body, preferably 6% longer, results in the wave-like shape of the membrane 16 shown during the closing action.

Figure 7:
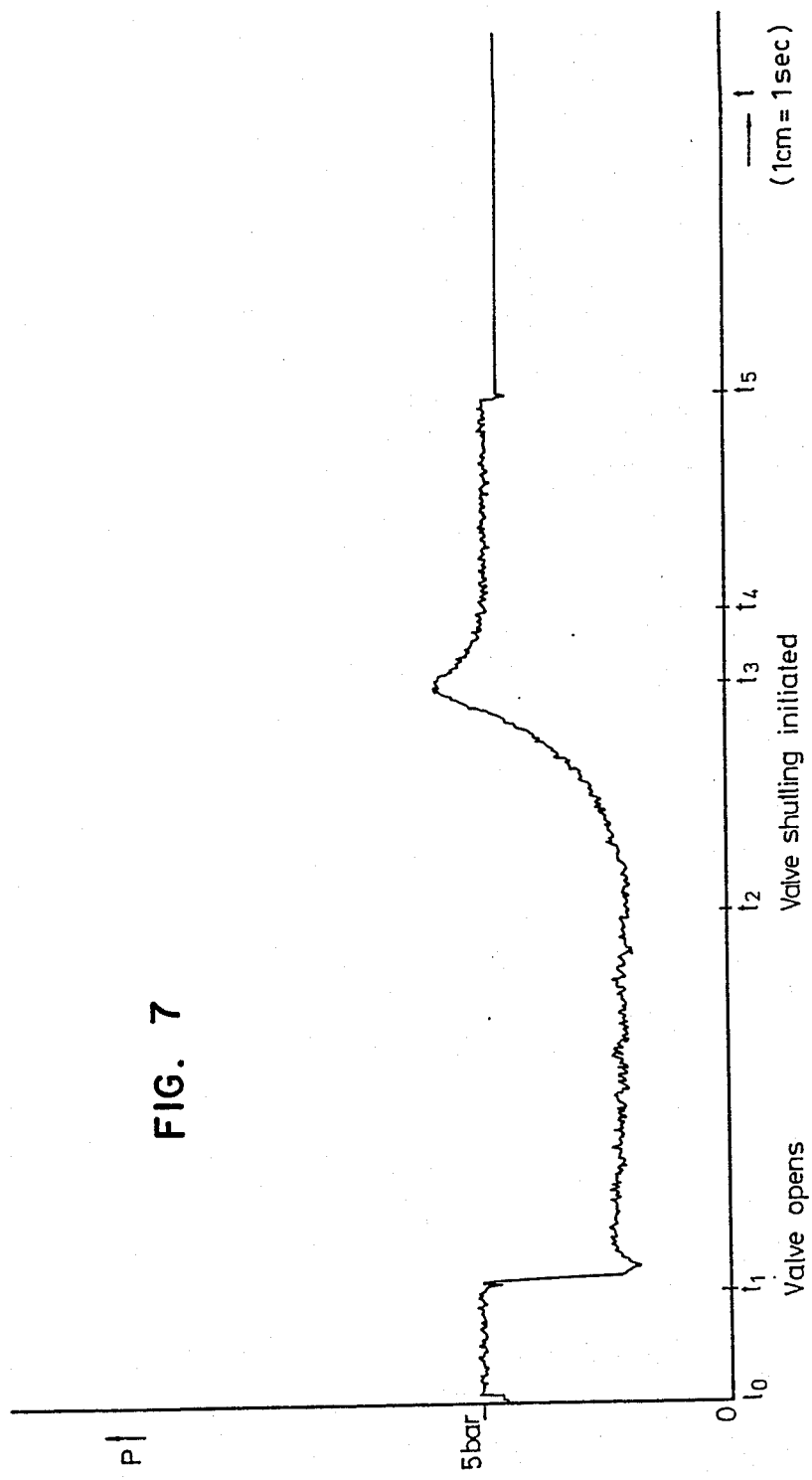

The benefit of this increased length can clearly be seen by looking at the graph of FIG. 7, which is a graph of the same kind as shown in FIGS. 3 and 5. Once again the valve is closed at the time $t_0$ and is opened at the time $t_1$. At the time $t_2$ the closing of the valve is initiated by closing the armature 61 against the ring seat 57. It will be noted that the closing of the valve proceeds progressively until it is fully shut at the time $t_3$ which occurs with only a very slight overpressure (peak pressure 5.6 bar) compared to the steady state closed pressure of 5 bar, and that this pressure peak dies away gently without any subsequent oszillation.

The very slight overpressure is scarcely perceptible, it does not result in any damaging closing hammer and the entire closing process of the valve is audibly scarcely perceptible. There is a just a dull thud as the valve shuts and there is no subsequent oscillation, rustling or ringing in the pipe network. The pressure upstream of the valve is at a steady level at the time $t_4$ some 1½ seconds after the slight pressure peak at the time $t_3$. Once again the measurement is discontinued at the time $t_5$.

The graph of FIG. 7 makes the superior performance of the valve of FIG. 6 eminently clear.

Figure 8:
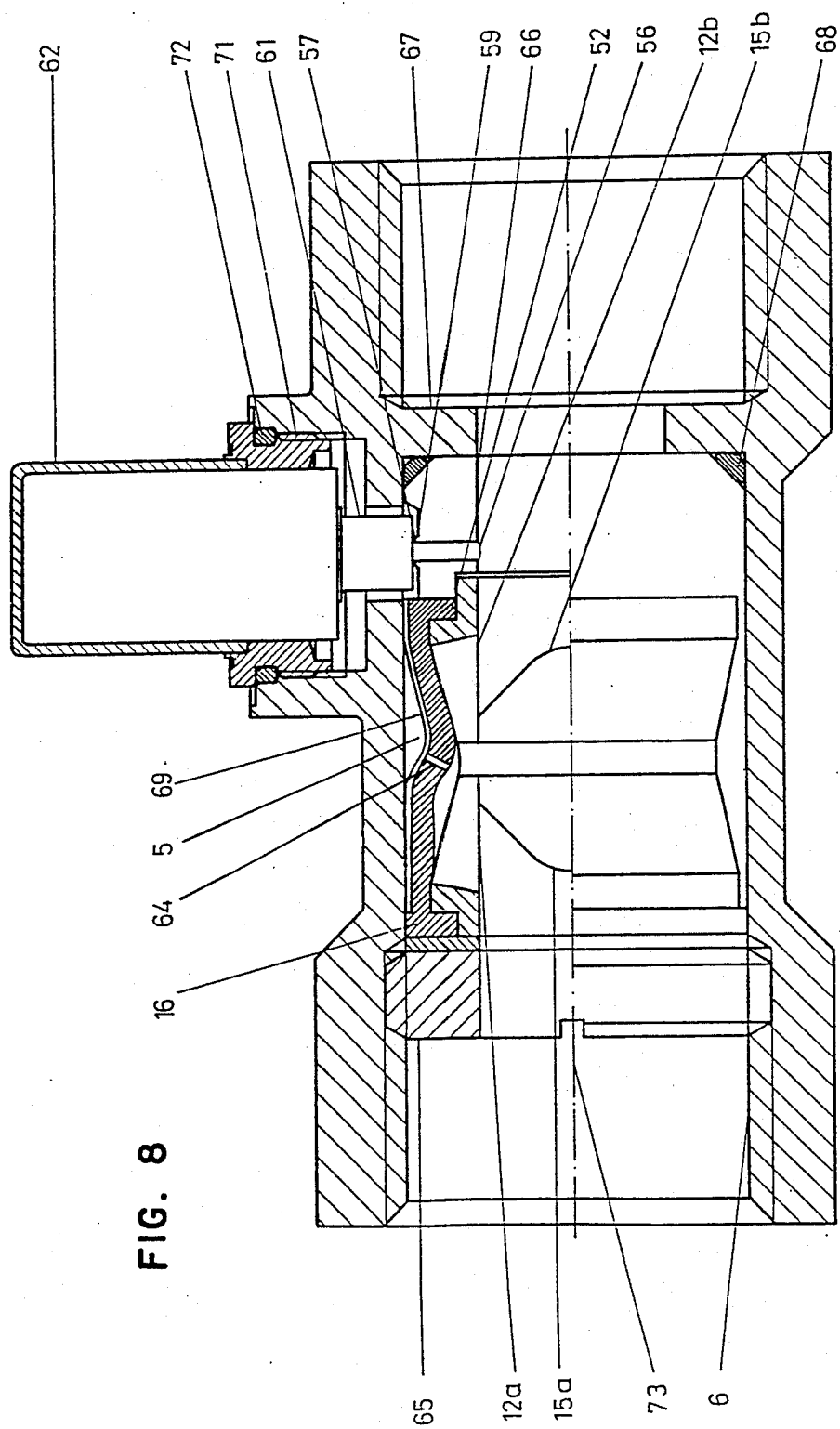

A further preferred embodiment of a tubular membrane valve in accordance with the present invention is shown in FIG. 8. In general the same reference numerals are used in FIG. 8 as have been used in the preceding figures to describe parts common to the various embodiments and these parts will not be discussed in detail here. There are however a number of special features of the valve of FIG. 8 which are worthy of particular mention.

First of all it will be noted that the valve has only a one-piece housing. This housing can largely be produced by a simple turning operation and it can thus be manufactured relatively inexpensively. The center part of the valve comprising the membrane and the support body, which is constructed largely identically to the sleeve-like membrane and support body of the embodiment of FIG. 6, is simply slid into the housing from the inflow end and is secured by a ring or tube nut 65 which is screwed into the threads which are in any event present in the inflow connection 6. The valve of FIG. 8 is again a servo-controlled valve but the duct means 55 is not formed-in the housing itself but instead in a ring-like insert 66 of plastic material which is slid into the tubular housing 10 in advance of the membrane and support body assembly. The ring 66, which is sealed against a downstream shoulder 67 of the tubular housing by an 0-ring 68, has a simple radial bore corresponding to the duct means 56 of the embodiment of FIG. 6. Again this bore 56 terminates at a ring seat 57 which is capable of being blocked or freed by the armature 61 of a solenoid 62. Moulded into the outer surface of the plastic ring 66 is a ring chamber 59 surrounding the ring seat 57 which communicates with a longitudinal channel 69 in the outside of the membrane 16 so that there is a clear communication established between the ring chamber 5 and the ring recess 59 which just breaks through the end wall of the insert 66 adjacent the membrane 16 to provide a continuity of communication.

The plastic insert 66 is preferably bonded to the downstream end flange 52 of the membrane 16 which facilitates its insertion into the tubular housing 10. With this embodiment the position of the aperture in the housing for receiving the solenoid 62 which is threaded into the housing at 71 with an O-ring 72 for sealing purposes is not particularly critical. Moreover, there is no need to drill inclined bores as in the embodiment of FIG. 4 or to make a multi-piece housing as in FIG. 6.

The support body of FIG. 8 is closely similar in shape to the support body of FIG. 6, is however constructed differently since the flow cones 15a and 15b are moulded together with the respective inflow and outflow portions 12a and 12b. The precise detail of the construction can be seen from the exploited view of FIG. 9.

The portions 12a and 12b are in fact of identical construction and are manufactured using one and the same injection moulding tool. The moulding 12a is shown partly in axial section (above the longitudinal axis of symmetry 73 equivalent to the axis of symmetry 73 of the valve of FIG. ) and partly in plan view (below the axis of symmetry 73). The disk forming the partition wall is also shown partly in longitudinal section (above the axis 73) and partly in plan view (below the axis 73).

As in the embodiment of FIG. 6 each of the moulded portions 12a and 12b comprises a generally truncated cone shaped structure with a plurality of elongate flow slots 74 extending at uniform intervals around the periphery of each truncated cone. The slots are defined between adjacent webs 50 of each truncated cone shaped structure with the webs all being connected together at their upstream ends (inflow portion 12a) or at their downstream ends (inflow portion 12b) at a solid ring 51 adapted to clamp the associated flange 52 of the sleeve-like membrane against the housing, or against the insert 66 respectively. In distinction to the embodiment of FIG. 6 the webs 50 are however also connected together at their downstream ends, and indeed to the radially outer edge of the associated flow cone 15a, 15b. The webs however lie radially outside of the flow cones. In this way a more rigid structure is obtained, the advantage is nevertheless retained of allowing the elongate slots 74 to open at one end face of the associated inflow and outflow portion, thus facilitating the manufacture of these slots by injection moulding. The partition wall 14 having the sealing bead 14a has a central aperture 75 which fits over a cylindrical spigot 76a of the inflow portion 12a and over a corresponding cylindrical spigot 76b of the outflow portion 12b. These two cooperating cylindrical spigots thus completely center the partition wall 14 relative to the inflow and outflow portions of the support body. Moreover, a small O-ring 77 can be provided to ensure perfect sealing between these parts.

Inside the cylindrical spigot there is molded an elongate recess 78 of polygonal cross-section (preferably hexagonal) and a threaded stud 79 is screwed into the recess 78 by means of a socket head 81 formed in one end of the stud. The stud 79 cuts its own thread as it is screwed into the polygonal recess. Once the stud has been inserted into say the inflow portion the disk 14a is placed over the spigot 76a and the outflow portion 12b is screwed onto the free end of the stud 79 so that the free end of the stud cuts its own thread in the corresponding polygonal recess, i.e. in the spigot 76b of the outflow cone 15b. This assembly step results in compression of the O-ring 77 producing the desired seal. The flexible membrane can then be installed over the cage and the assembly inserted in the tubular housing 10 of FIG. 8. Clearly the two spigots 76a and 76b could be made with interfitting snap connection features so that they are retained together by this snap connection. It will be appreciated that these features need not provide a very strong connection since once the support structure is installed in the housing the parts of the structure are held together by the ring nut 65 or by the clamping pressure resulting from the assembly with the resilient membrane.

Figures 9, 10:
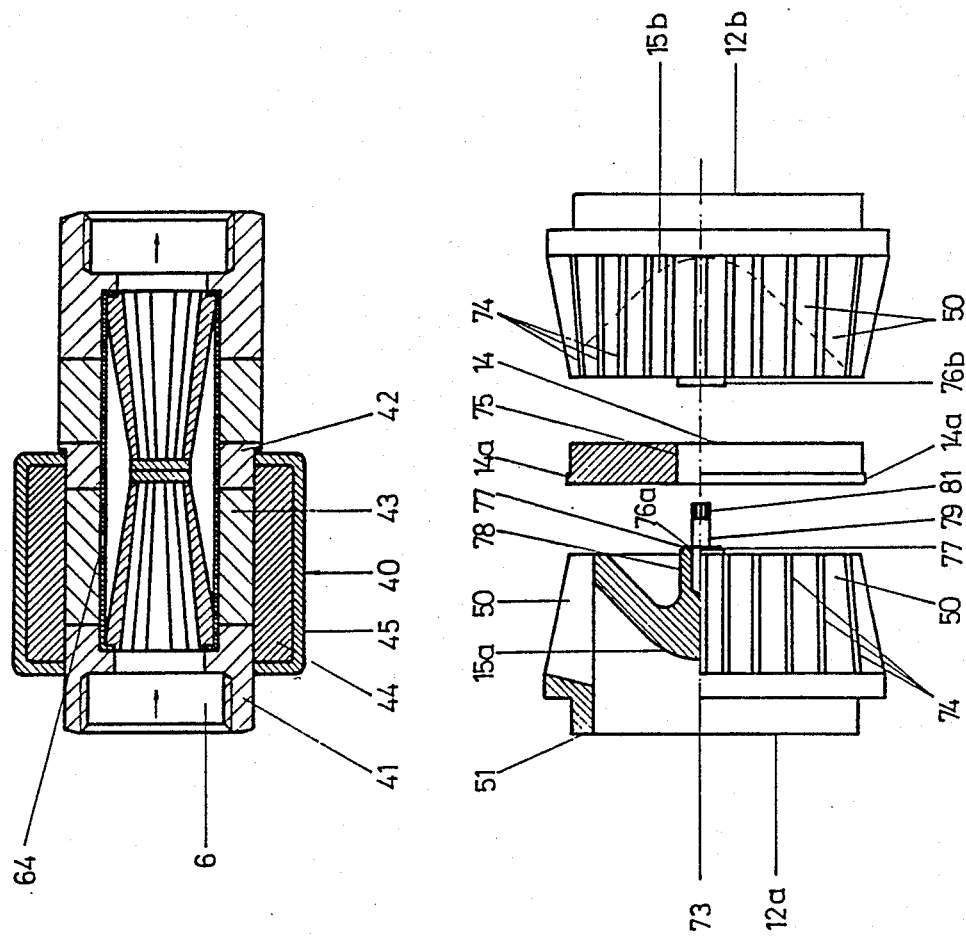
FIG. 9 is a detailed cross-section through the support body of the valve of FIG. 8.
FIG. 10 is a directly operating electromagnetically-actuatable 2—2 way value with a magnetizable membrane.

Finally, FIG. 10 shows an embodiment similar to the embodiment of FIG. 4 but in which the membrane is actuated not by an external pressure source but instead by an electromagnet.

More specifically FIG. 10 shows a directly operating electromagnetically actuatable 2/2 way valve with basically the same construction as in the preceding embodiments. In this case the flexible hose membrane 16 is made magnetisable. This can for example be done by adding finely divided iron particles or another finely divided magnetisable material to the elastomeric material from which the hose membrane is manufactured during the extrusion process. Alternatively magnetisable metal parts, for example of narrow elongate strip shape, can be attached to the hose membrane. In this case the magnetic circuit 40 of this valve is built-up, as usual, of soft iron magnetic pole pieces 41 (simultaneously the part of the valve housing 10 containing the inflow connection 6) and 42, of a non-magnetisable part 43 of the housing 10 which lies between the pole pieces 41 and 42, of a soft magnetic yoke 45 (i.e. magnetisable material of low retentivity) and of a coil or winding 44.

The low stroke of the hose membrane ensures reliable switching of this magnetic embodiment. A restrictor bore 64 is provided in the membrane 16 and its size can be determined in accordance with the desired switching behaviour. The favourable overflow conditions for the concentric type of valve makes it possible to provide a considerable free throughflow cross-section with a very low stroke. Switching takes place almost noiselessly and no opening or closing hammer occurs with gaseous or liquid fluids. In this way a valve of this kind is particularly suitable, when manufactured of appropriate materials, for medical purposes, for example for various fluid lines which are used in intensive care stations for the monitoring and therapeutic treatment of individual patients. In this case the patients are not disturbed and annoyed by the click sounds which otherwise occur.

As can be easily recognised the illustrated embodiments do not exhaustively show the entire range of applications for such valves. By way of example constructional types are also conceivable in which the hose membranes close not only against inner sealing edges but also against outer sealing edges so that multi-way valves can also be simply and cost-effectively manufactured. In this case the support walls can also be manufactured of porous sinter materials (filter effect) or of perforated sheet metal with small or large perforations, of stable grids of different mesh widths etc.

It should also be pointed out that features set forth in the preceding description, but not currently claimed, are also regarded as being part of the invention.

I claim:

1. A membrane valve for controlling fluids, the valve comprising a housing surrounding a substantially tubular chamber and having an inlet end and an outlet end; a sleeve-like resilient membrane extending within said tubular chamber from said inlet end to said outlet end; and a fluid permeable membrane support body disposed within said sleeve-like membrane and extending from said inlet end to said outlet end; wherein said support body has a length dimension measured in the absolute direction along its regular outer surface which is less than a corresponding length dimension in a relaxed state of a portion of said membrane adapted to contact said radially outer surface in said closed position; wherein said membrane support body has an annular sealing surface extending around it intermediate said inlet and outlet ends; wherein a partition wall divides said support body into a fluid permeable inlet portion, disposed between said inlet end and said annular sealing surface, and a fluid permeable outlet portion disposed between said sealing surface and said outlet end; wherein at least said outlet portion has a diverging substantially frustoconical shape with a narrower diameter region adjacent said sealing surface and a broader diameter region adjacent said outlet end; and wherein means is provided for producing movement of said membrane between a valve open position in which said membrane is spaced from said annular sealing surface and permits flow from said inlet end through said firm fluid permeable inlet portion over said annular sealing surface through said fluid permeable outlet portion and out of said outlet end, and a valve closed position in which said membrane sealingly contacts said annular surface and substantially prevents flow through said valve.

2. A membrane valve in accordance with claim 1, wherein said inlet portion is a convergent portion having an at least substantially frusto-conical shape with a narrower diameter region adjacent said sealing surface and a broader diameter region adjacent said inlet end.

3. A membrane valve in accordance with claim 2, wherein said narrower diameter regions of said inlet and outlet portions are of substantially the same diameter.

4. A membrane valve in accordance with claim 3, wherein said broader diameter regions of said inlet and outlet portions are of substantially the same diameter.

5. A membrane valve in accordance with claim 1, wherein said corresponding length dimension of said membrane is from 4 to 8 percent and preferably 6 percent greater than said length dimension of said support body.

6. A membrane valve in accordance with claim 1, wherein said inlet and outlet portions are hollow.

7. A membrane valve in accordance with claim 6, wherein inlet and outlet flow cones are provided at said partition wall within said inlet and outlet portions respectively.

8. A membrane valve in accordance with claim 6, wherein a plurality of elongate slots are provided in said inlet portion and in said outlet portion permitting flow outwardly through said inlet portion and inwardly through said outlet portion.

9. A membrane valve in accordance with claim 8, wherein said slots extend in an axial direction.

10. A membrane valve in accordance with claim 9, wherein said elongate slots are defined between webs of said inlet and outlet portions, with said webs having radially outer surfaces belonging to a common envelope surface contactable by said membrane in said closed position.

11. A membrane valve in accordance with claim 1, wherein said fluid permeable support body comprises an injection moulding.

12. A membrane valve in accordance with claim 11, wherein said inlet portion and said outlet portion of said fluid permeable support body comprise respective injection mouldings there being screw means at said partition wall for connecting said first and second injection mouldings together.

13. A membrane valve in accordance with claim 12, wherein a ring member is interposed between said mouldings defining said inlet portion and said outlet portion with the radially outer surface of said ring member defining said annular seating surface.

14. A membrane valve in accordance with claim 13, wherein said ring member has a raised annular bead at its radially outer surface defining said sealing surface.

15. A membrane valve in accordance with claim 13, wherein said elongate slots in said inlet portion open at an end face thereof remote from said inlet end and wherein said elongate slots in said outlet portion open at an end face thereof remote from said outlet end.

16. A membrane valve in accordance with claim 13, wherein an inlet flow cone is present in said inlet portion and an outlet flow cone is present in said outlet portion and wherein said screw means connecting said portions together comprises a male threaded element present in one of said flow cones and an aperture for receiving said threaded element in the other of said flow cones to form a threaded connection.

17. A membrane valve in accordance with claim 16, wherein said threaded element comprises a screw screwed or moulded into the associated one of said flow cones.

18. A membrane valve in accordance with claim 1, wherein said tubular chamber has a first radially inwardly extending ring shoulder adjacent said inlet end and a second radially inwardly extending ring shoulder adjacent said outlet end, wherein said sleeve-like resilient membrane has radially inwardly extending flanges adjacent said inlet end and said outlet end respectively and wherein, in the assembled state, said first flange is pressed against said first ring shoulder by said inlet portion of said support body and said second flange is pressed against said second ring shoulder by said outlet portion of said support body.

19. A membrane valve in accordance with claim 18, wherein said housing comprises first and second parts each containing one of said ring shoulders and screw means for securing said first and second parts together.

20. A membrane valve in accordance with claim 1, wherein one or more ribs are provided on a radially outer surface of said resilient membrane to space said membrane from said housing thus facilitating flow of an actuating fluid around said membrane.

21. A membrane valve in accordance with claim 1, wherein said means for producing movement of said membrane comprises means for supplying pressure to and for venting a space defined between said housing and said flexible sleeve-like membrane.

22. A membrane valve in accordance with claim 1, wherein said membrane is magnetisable and preferably of low magnetic retentivity, at least adjacent an inflow region of said valve; and wherein said means for producing movement of said membrane comprises a magnetic circuit.

23. A membrane valve in accordance with claim 1, wherein said means for producing movement of said membrane comprises duct means communicating between said outlet end of said housing and said tubular chamber radially outside of said membrane, a pilot valve for selectively blocking and freeing said duct means and a restrictor opening in said membrane with said restrictor opening having a flow cross-section smaller than the minimum flow cross-section of said duct means when freed by said pilot valve.

24. A membrane valve for controlling fluid, said valve comprising:
(a) a housing surrounding a substantially tubular chamber and having an inlet end and an outlet end;
(b) a sleeve-like resilient membrane extending within said tubular chamber from said inlet end to said outlet end;
(c) and a fluid permeable membrane support body disposed within said sleeve-like membrane and extending from said inlet end to said outlet end; wherein said support body has a length dimension measured in the absolute direction along its regular outer surface which is less than a corresponding length dimension in a relaxed state of a portion of said membrane adapted to contact said radially outer surface in said closed position; said membrane support body has an annular sealing surface extending around it intermediate said inlet and outlet ends;
(d) a partition wall dividing said support body into a fluid permeable inlet portion, disposed between said inlet end and said annular sealing surface, and a fluid permeable outlet portion disposed between said sealing surface and said outlet end; wherein at least said outlet portion has a diverging substantially frusto-conical shape with a narrower diameter region adjacent said sealing surface and a broader diameter region adjacent said outlet end;
(e) means is provided for producing movement of said membrane between a valve open position in which said membrane is spaced from said annular sealing surface and permits flow from said inlet end through said firm fluid permeable inlet portion over said annular sealing surface through said fluid permeable outlet portion and out of said outlet end, and a valve closed position in which said membrane sealingly contacts said annular surface and substantially prevents flow through said valve; and (f) at least one of said support body and said membrane is secured into said housing by a ring nut screwed into said housing.

25. A membrane valve for controlling fluids according to claim 24, wherein said housing is a one-piece construction.

26. A membrane valve for controlling fluids, the valve comprising:
   (a) a housing surrounding a substantially tubular chamber and having an inlet end and an outlet end;
   (b) a sleeve-like resilient membrane extending within said tubular chamber from said inlet end to said outlet end;
   (c) and a fluid permeable membrane support body disposed within said sleeve-like membrane and extending from said inlet end to said outlet end; wherein said support body has a length dimension measured in the absolute direction along its regular outer surface which is less than a corresponding length dimension in a relaxed state of a portion of said membrane adapted to contact said radially outer surface in said closed position; wherein said membrane support body has an annular sealing surface extending around it intermediate said inlet and outlet ends;
   (d) a partition wall divides said support body into a fluid permeable inlet portion, disposed between said inlet end and said annular sealing surface, and a fluid permeable outlet portion disposed between said sealing surface and said outlet end; wherein at least said outlet portion has a diverging substantially frusto-conical shape with a narrower diameter region adjacent said sealing surface and a broader diameter region adjacent said outlet end; and
   (e) means is provided for producing movement of said membrane between a valve open position in which said membrane is spaced from said annular sealing surface and permits flow from said inlet end through said firm fluid permeable inlet portion over said annular sealing surface through said fluid permeable outlet portion and out of said outlet end, and a valve closed position in which said membrane sealingly contacts said annular surface and substantially prevents flow through said valve; said movement producing means including duct means communicating between said outlet end of said housing and said tubular chamber radially outside of said membrane, a pilot valve for selectively blocking and freeing said duct means and a restrictor opening having a flow cross-section smaller than the minimum flow cross-section of said duct means when freed by said pilot valve; said duct means being formed, at least in part, in an insert inserted into said tubular housing at the outlet end thereof, and said duct means including a radial bore in said insert, said radial bore opening at a radially outer surface of said insert and forming an opening capable of being selectively blocked or freed by said pilot valve.

27. A membrane valve in accordance with claim 26, wherein said opening in said insert is disposed within a projecting ring seat.

28. A membrane valve in accordance with claim 26, wherein said duct means further comprises a channel in the radially outer surface of said insert leading to said tubular chamber radially outside of said membrane.

29. A membrane valve in accordance with claim 27, wherein said insert is joined to said membrane at an axially downstream end thereof.

30. A membrane valve for controlling fluids, the valve comprising:
   (a) a housing surrounding a substantially tubular chamber and having an inlet end and an outlet end;
   (b) a sleeve-like resilient membrane extending within said tubular chamber from said inlet end to said outlet end;
   (c) a fluid permeable membrane support body disposed within said sleeve-like membrane and extending from said inlet end to said outlet end; wherein said support body has a length dimension measured in the absolute direction along its regular outer surface which is less than a corresponding length dimension in a relaxed state of a portion of said membrane adapted to contact said radially outer surface in said closed position; wherein said membrane support body has an annular sealing surface extending around it intermediate said inlet end and outlet ends;
   (d) a partition wall divides said support body into a fluid permeable inlet portion, disposed between said inlet end and said annular sealing surface, and a fluid permeable outlet portion disposed between said sealing surface and said outlet end; wherein at least said outlet portion has a diverging substantially frusto-conical shape with a narrower diameter region adjacent said sealing surface and a broader diameter region adjacent said outlet end; and
   (e) means is provided for producing movement of said membrane between a valve open position in which said membrane is spaced from said annular sealing surface and permits flow from said inlet end through said firm fluid permeable inlet portion over said annular sealing surface through said fluid permeable outlet portion and out of said outlet end, and a valve closed position in which said membrane sealingly contacts said annular surface and substantially prevents flow through said valve; said movement producing means including duct means communicating between said outlet end of said housing and said tubular chamber radially outside of said membrane, a pilot valve for selectively blocking and freeing said duct means and a restrictor opening having a flow cross-section smaller than the minimum flow cross-section of said duct means when freed by said pilot valve; said duct means being formed, at least in part, in an insert inserted into said tubular housing at the outlet end thereof.

31. A membrane valve for controlling fluids, the valve comprising:
   (a) a housing surrounding a substantially tubular chamber and having an inlet end and an outlet end;
   (b) a sleeve-like resilient membrane extending within said tubular chamber from said inlet end to said outlet end;
   (c) and a fluid permeable membrane support body disposed within said sleeve-like membrane and extending from said inlet end to said outlet end; wherein said membrane support body has an annular sealing surface extending around it intermediate said inlet and outlet ends;
   (d) a partition wall divides said support body into a fluid permeable inlet portion, disposed between said inlet end and said annular sealing surface, and a fluid permeable outlet portion disposed between said sealing surface and said outlet end; wherein at least said outlet portion has a diverging substantially frusto-conical shape with a narrower diameter region adjacent said sealing surface and a broader diameter region adjacent said outlet end; and (e) means is provided for producing movement of said membrane between a valve open position in which said membrane is spaced from said annular sealing surface and permits flow from said inlet end through said fluid permeable inlet portion over said annular sealing surface through said fluid permeable outlet portion and out of said outlet end, and a valve closed position in which said membrane sealingly contacts said annular surface and substantially prevents flow through said valve; said movement producing means including duct means communicating between said outlet end of said housing and said tubular chamber radially outside of said membrane, a pilot valve for selectively blocking and freeing said duct means and a restrictor opening in fluid communication with said duct means when freed by said pilot valve; said duct means comprising a radial bore in said housing, said radial bore opening at a radially outer surface of said housing and forming an opening capable of being selectively blocked or freed by said pilot valve.

* * * * *